Sept. 20, 1971 J. H. WILSON 3,606,257

TRACTION DRUM WINCH WHICH EXERTS A PREDETERMINED CONSTANT TENSION ON A CABLE

Filed Dec. 31, 1968 13 Sheets-Sheet 1

JOHN HART WILSON
*INVENTOR.*

BY

Wayland D. Keith
HIS AGENT

JOHN HART WILSON
INVENTOR.

BY

Wayland D. Keith
HIS AGENT

JOHN HART WILSON
*INVENTOR.*

BY

Wayland D. Keith
HIS AGENT

JOHN HART WILSON
*INVENTOR.*
BY
Wayland D. Keith
HIS AGENT

JOHN HART WILSON
INVENTOR.

BY Wayland D. Keith
HIS AGENT

JOHN HART WILSON
INVENTOR.

BY

Wayland D. Keith
HIS AGENT

JOHN HART WILSON
INVENTOR.
BY
Wayland D. Keith
HIS AGENT

JOHN HART WILSON
INVENTOR.
BY
Wayland D. Keith
HIS AGENT

INVENTOR.
JOHN HART WILSON
BY
Wayland D. Keith
HIS AGENT

JOHN HART WILSON
INVENTOR.
BY
Wayland D. Keith
HIS AGENT

Sept. 20, 1971 J. H. WILSON 3,606,257

TRACTION DRUM WINCH WHICH EXERTS A PREDETERMINED CONSTANT TENSION ON A CABLE

Filed Dec. 31, 1968 13 Sheets-Sheet 11

JOHN HART WILSON
INVENTOR.

BY Wayland D. Keith
HIS AGENT

JOHN HART WILSON
*INVENTOR.*

BY

Wayland D. Keith
HIS AGENT

JOHN HART WILSON
INVENTOR.

BY

Wayland D. Keith
HIS AGENT

United States Patent Office 3,606,257
Patented Sept. 20, 1971

3,606,257

TRACTION DRUM WINCH WHICH EXERTS A PREDETERMINED CONSTANT TENSION ON A CABLE

John Hart Wilson, % Wilson Manufacturing Co., P.O. Box 1031, Wichita Falls, Tex. 76307

Filed Dec. 31, 1968, Ser. No. 788,256
Int. Cl. B66d *1/48*
U.S. Cl. 254—175.7 4 Claims

ABSTRACT OF THE DISCLOSURE

A traction drum winching mechanism utilizing a storage drum on which a substantially constant tension is maintained to reel cable thereonto at a tension less than that which will crush a cable. This enables a cable of large diameter to be wound onto a storage drum without crushing. Water cooled clutches and brakes are provided to enable the clutches and brakes to be slipped continuously over an indefinite period of time without heating, and a sensing mechanism is provided for sensing the weight of the drilling pipe to enable drilling to be continued from a barge, drill ship or vessel, which vessel is being subjected to rise and fall due to waves, while maintaining constant tension on the pipe without the movement of the drill ship or vessel interfering with the drilling of the bore hole. Provision is made to spool the convolutions of cable in side by side relation with a slight crowd angle, by means of a hydraulically actuated cable spooling device.

This application is co-pending with my application Ser. No. 713,094, Method of and Apparatus for Maintaining a Constant Tension on the Drill Pipe of a Rotary Drilling Rig From a Floating Platform or the Like, filed Mar. 14, 1968.

This invention relates to improvements in winching devices which use traction drums and a cable storage drum with drilling equipment on a drill ship or barge. The same type winching mechanism may be used in connection with ship anchors to maintain a drill ship, barge or vessel in a substantially stationary location to enable the drilling of bore holes on the floor of the ocean.

In using the present winching mechanism with a drilling rig on a drill ship or barge, for drilling a bore hole with a rotary drilling rig, a sensing mechanism is utilized to maintain the cable, which supports the drill pipe in the well, at a constant tension, regardless of the rise and fall of the drilling barge, drill ship or vessel due to the wave motion of the water. A pressure sensing device senses the weight on the cable and permits downward movement of the drill bit at a uniform rate of drilling, regardless of the rise and fall of the drilling barge, drill ship or vessel.

The spooling of the cable onto a cable storage drum, for cable from one and one-half inches to three inches in diameter, requires that the cable be spooled onto the storage drum without flattening and with the convolutions thereof substantially in side by side relation, with a slight crowd angle to cause the cable to lie in close contact relation with the previous convolutions thereof.

Various level winding mechanisms have been proposed heretofore, but these, for the most part, would cause the cable to bend at the level winding guiding device which guides the cable onto the drum immediately before the cable is wound onto the drum, which puts undue strain or wear on the level winding guiding device and, in the case of highly stressed cables, will cause rapid wear thereon, and also wear on the cable.

The present traction drum winching mechanism enables the pulling of heavy loads with a relatively large cable, without flattening or otherwise damaging the cable, which often results when cable is wound directly onto a storage drum with the pull causing the cable being wound thereonto to bury between other convolutions of the cable when under a great strain.

The present arrangement enables the cable to be reeled in at a relatively high speed and wound onto a storage drum at a much lower tension than it would be if the load were being pulled by the drum on which the cable is wound. In this manner, longer life is had from the cable, furthermore, the traction drums, which exert the pull on the cable, which are relatively large in diameter and have grooves therein, which grooves support a portion of the diameter of the cable.

It is preferable to have the first one or two grooves of each of the traction drum sheaves lined with an elastomer, which grooves receive cable just prior to the cable passing onto the storage drum or off of the storage drum. With the elastomer, such as a synthetic rubber, polyurethane, or the like, lining the first one to two grooves of the traction drum, a greater friction is exerted on the cable, which friction is multiplied by the number of times the cable is wrapped around the traction drums. In this manner, great pulling power may be exerted on the load pulling end of the cable that extends outward from the traction drums.

It is desirable to wind the cable onto the storage drum at an even tension, so the cable will be properly and tightly spooled onto the drum, and at the same time, present sufficient pull on the first turn of the traction sheave to provide the required pull on the hoisting cable.

Provision is made to control the tension at which the cable is wound onto the storage drum, which tension is controlled independently of the power used to turn the traction drum sheaves to pull the load. The present traction drum winch is so constructed as to handle very heavy cables, in a range up to three inches in diameter, at a relatively high speed. The level winding mechanism will lay the cable onto the storage drum at substantially a right angle to the axis thereof, but with a crowd angle sufficient to cause the cable to lay in close, side by side convolutions due to this crowd angle, which is maintained on the cable while it is winding onto the storage drum, spool or the like.

Provision is made for varying the torque on the drum as the cable builds up on the drum, yet the same tension is maintained on the cable, as for instance, on the first layer of cable, less torque is applied to winding the cable on the drum and this is automatically varied as each layer of the cable is wound onto the drum until the last layer of cable is wound onto the drum.

By making the storage drum and the cable guide means relatively movable, as the cable is spooled onto the drum, the cable is properly laid on the drum at all times. The present traction drum winching mechanism includes the cable storage drum and the level winding mechanism for directing the cable, or layers of cable tangentially onto the drum, with the cable lying in a plane that is substantially perpendicular to the axis of the storage drum, except for the crowd angle that moves the cable against adjoining convolutions of the cable regardless of the direction of the cable is being wound onto the drum.

An object of this invention is to provide a traction drum winching mechanism and a sensing device to maintain a constant tension on drill pipe of a rotary drilling rig, which drilling rig is normally mounted on a barge, drill ship or vessel, to enable the drill pipe to remain relatively stationary with respect to the ocean floor, except for the normal downward movement of the drill pipe due to the drilling operation, as the barge, drill ship or vessel rises and falls while floating on the water, due to swells, waves, tides and the like.

Another object of the invention is to provide a drilling rig system for barges, drill ships or vessels, which system embodies two traction drums, with a drilling cable therearound, connected to a storage drum, the other portion of which drilling cable passes over the crown block sheaves on the upright supporting derrick structure and the tension is sensed by a transducer and transmitted to a transducer pressure receiver which is connected to pressure control sensing actuator which operates a regulator which will automatically maintain a regulated tension on the cable which supports the drill pipe.

Still another object of the invention is to provide an automatic drilling feed control for a drill line to maintain a constant weight on the rotary drill bit by continuously slipping a fluid cooled clutch, as necessary to maintain a regulated tension on the winch drum.

Another object of this invention is to provide a winding mechanism for presenting an even tension pull on the cable as the cable is being wound onto a storage drum without distorting or crushing the cable.

A further object of the invention is to provide a traction drum winch which has controlled braking and clutching means on both the traction drums and the storage drum, so as to present a steady, even pull on the cable, whether winding up or paying out the cable automatically at the desired tension.

Still another object of the invention is to provide a level winding mechanism intermediate the traction drum winching mechanism and the storage drum, whereby the cable is directed onto a sheave from the traction drum winching mechanism, at the proper angle, and directed off of the level winding mechanism at the proper angle, so as to direct the cable in side by side convolutions onto the storage drum with sufficient crowd angle to cause the cable to spool properly.

And still a further object of the invention is to provide a cable winding mechanism whereby the cable is fed longitudinally into the level winding mechanisms so the cable will not be bent sharply, and then to direct the cable from a sheave, of relatively large radius, on the level winding mechanism onto a drum for storage.

Another object of the invention is to provide a slip clutch system to reel in or pay out the cable at a predetermined constant tension.

Still another object of the invention is to provide a brake mechanism which may be set to slip at a predetermined torque to pay out cable at a predetermined tension.

With these objects in view and others which will become manifest as the description proceeds, reference is to be had to the accompanying drawings in which like reference characters designate like parts in the several views thereof, in which:

FIG. 1 is a top plan view of a traction drum winching mechanism showing a pair of gear driven traction drum sheaves, showing a plurality of motors connected to the traction drum sheaves in geared relation, showing a storage drum for winding cable thereonto and paying cable therefrom, and also showing friction clutches and friction brakes for controlling the slippage of the clutches so as to exert a predetermined torque on the various winching mechanisms;

Figures 21, 22:
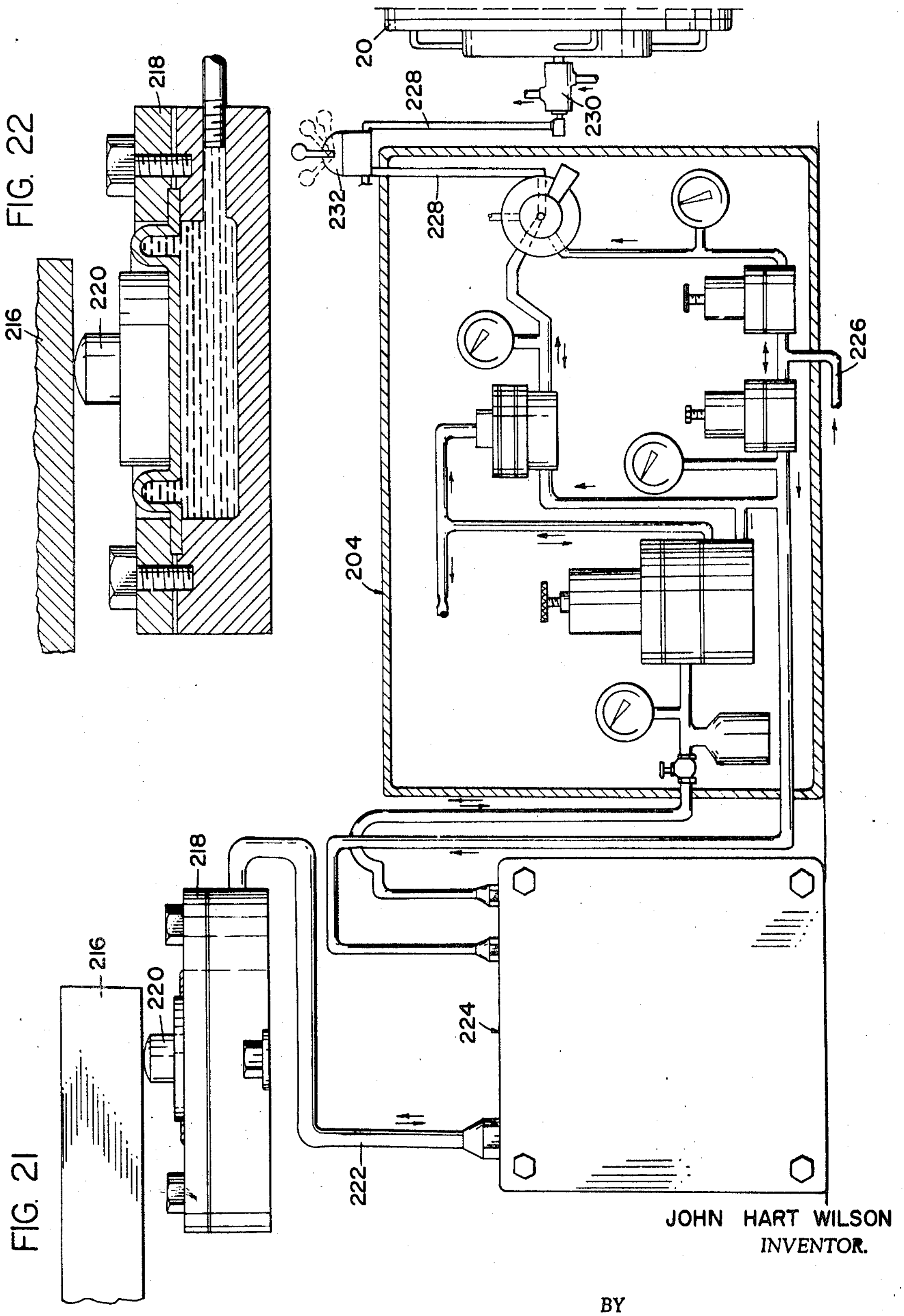

FIG. 21 is an enlarged diagrammatic view of the weight sensing transducer associated with the drilling rig and showing the transducer pressure receiver and the pressure control sensing actuator, with the pressure control sensing actuator, connected to an air actuated, fluid cooled clutch; and FIG. 22 is an enlarged diagrammatic sectional view through the diaphragm and diaphragm chamber of the weight sensing transducer.

Figure 1:
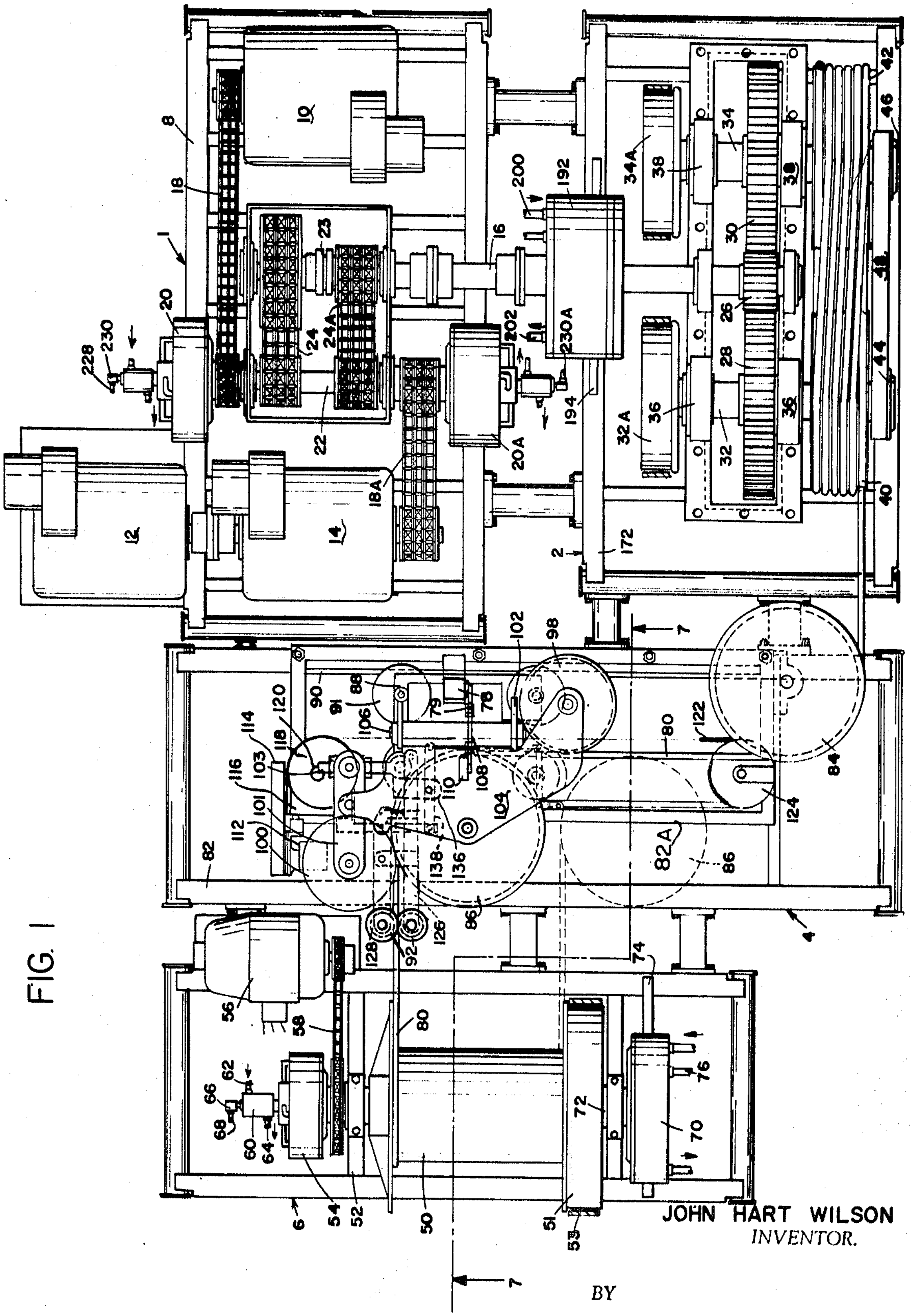

With more detailed reference to the drawings, the numeral 1 designates generally a power unit having one or more prime movers thereon, which prime movers are connected in geared relation, so as to exert power on a traction drum winching mechanism, generally designated by the numeral 2, for driving a hoisting mechanism of a rotary drilling rig on a floating vessel, barge or drill ship, or any rotary drilling rig. The traction drum winching mechanism 2 is associated with a level winding mechanism 4, which directs the cable from the traction drum winching mechanism 2 to a storage drum mechanism, generally designated by the numeral 6, and vice versa. The power unit, as shown in FIG. 1, comprises a base or skid frame 8 on which a plurality of motors 10, 12 and 14 are mounted so as to transmit torque in varying degrees to a drive shaft 16.

The motor 10 is connected through a sprocket and chain arrangement 18 with a clutch 20, and when clutch 20 is engaged, it connects the motor 10 with a countershaft 22 which is connected to drive shaft 16 by a chain and sprocket arrangement 24 or 24A. When it is desired to use one motor, the motors 12 and 14 are not energized and may be left in disconnected relation with respect to countershaft 22. A gear 26 is mounted on and secured to drive shaft 16 and connected in driving relation with driven gears 28 and 30 to rotate the gears in the same direction. The gears 28 and 30 are mounted on and secured to the respective shafts 32 and 34, which shafts are journaled in bearings 36 and 38 respectively. Traction drums 40 and 42 are mounted on and secured to the respective shafts 32 and 34. Outboard, floating bearings 44 and 46 are journaled on the respective shafts 32 and 34 and are mounted on a spreader beam 48 which extends between the outer ends of the shafts 32 and 34 to hold the shafts a spaced distance apart.

Each of the traction drums 40 and 42 is grooved, which grooves are complemental with the cable which passes around the traction drums.

Figures 2, 3:
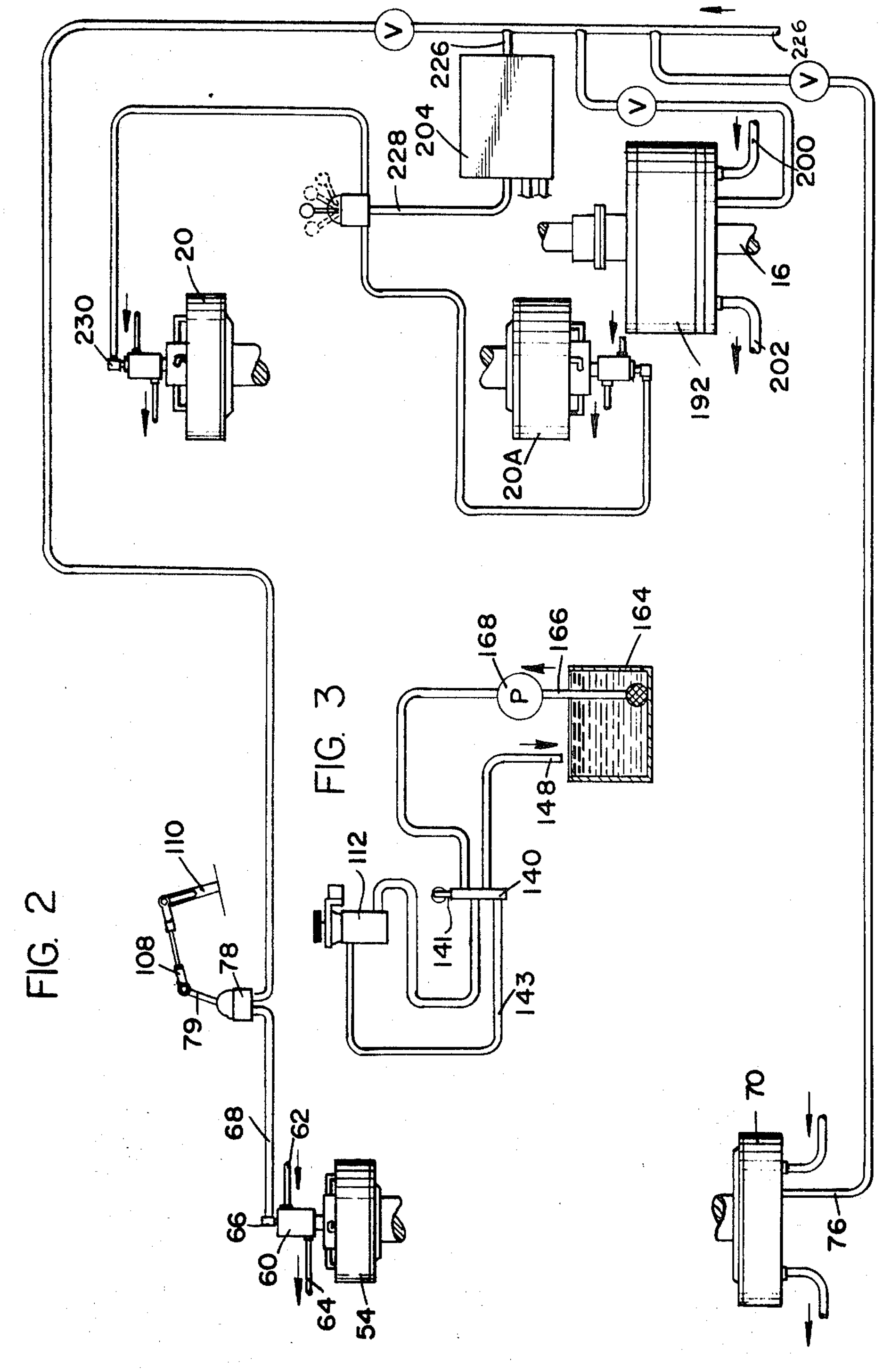
FIG. 2 is a diagrammatic view of the fluid actuating systems for controlling the clutches and brakes of the traction drum winching mechanism.
FIG. 3 is a diagrammatic view of the hydraulic system for actuating the level winding mechanism.

A cable storage drum 50 is mounted on support frame 52, which drum is in journaled relation with respect thereto, and is driven through clutch 54 by a motor 56, which drives through endless transmission arrangement 58, which may be sprockets and a chain. The clutch 54 is of the water cooled, fluid pressure actuated type, with the water passing into rotary fluid seal 60, through conduit 62 and out through conduit 64 after having passed through clutch 54 in a manner as shown in my co-pending application, Ser. No. 713,094, Method of and Apparatus for Maintaining a Constant Tension on the Drill Pipe of a Rotary Drilling Rig From a Floating Platform or the Like. The clutch 54 is fluid actuated with the fluid passing through rotary seal 66 from fluid supply conduit 68 in a manner best illustrated diagrammatically in FIG. 2. The drum 50 has a brake flange 51 thereon and conventional brake bands 53 are used, which brake bands are operated in a manner well known in the art of hoisting drums. A fluid cooled, air actuated brake 70 is secured in fixed relation with respect to frame 52 by a support yoke 74. The fluid actuated brake is preferably of the disc type and is air actuated, with the braking being effected by introducing and releasing air through conduit 76.

It is to be pointed out that varying degrees of torque may be applied to drum 50 by a variable fluid pressure control valve 78 which operates to increase the torque as convolutions of the cable 80 build up in layers on drum 50.

Adjacent the frame 52, of the storage drum mechanism 6, is a frame 82 on which the level winding mechanism 4 is mounted. The level winding mechanism 4 directs the cable 80 from the traction drum 40 onto a sheave 84, mounted on a stationary axis, so as to direct the cable at right angles therefrom and onto movable sheave 86, which is mounted on longitudinally movable carriage 88. The carriage 88 has wheels 91 thereon, which wheels are mounted on longitudinal rails 90, as will best be seen in FIGS. 1 and 7.

The cable from the level winding mechanism 4 has been shown as being directed around sheaves so the traction drum winching mechanism may be located in a certain arrangement, as shown in FIG. 1, however, this is for purposes of illustration and the traction drum winching mechanism may be located in any suitable relation to the level winding mechanism, so long as the cable entering onto the sheave 86 is substantially parallel with the axis of the storage drum 50. The storage drum 50 can be at any convenient location with respect to the traction drum sheaves, either on the same level, or on different levels, and arranged in any suitable relation with respect thereto.

The movable carriage 88 moves back and forth on longitudinal rails or track 90 and has an outwardly extending shaft 88A on one side thereof on which shaft a roller 88B is journaled to extend below an inwardly extending track 82A secured to stationary frame 82. The opposite side of the movable frame 88 has a shaft 88C secured thereto, which shaft has a roller 88D journaled thereon, which roller is in rolling engagement with track 82B on the upper face of stationary frame 82. Since the side pull of cable 80, winding onto the storage drum 50, will tend to cause roller 88B to engage the underside of track 82A and the roller 88D will engage the upper surface of track 82B, the movable carriage will be free to move back and forth on track 90 without binding.

As the carriage 88 moves longitudinally back and forth on track 90, it directs cable over the sheave 86 onto storage drum 50 substantially perpendicular thereto, except for a crowd angle exerted on cable 80 by sheaves 92 mounted on arms 126 and 128, which will cause the convolutions of the cable 80 to lay in side by side relation, at the closeness desired, in accordance with the setting of the valve shift mechanism, generally designated by the numeral 94, as will be more fully brought out hereinafter.

Sheaves 98 and 100 are mounted on the frame of movable support frame 104 so as to cause the cable to properly pass over sheave 86 as the cable may sometimes be as great in diameter as three inches or more, which requires that the cable be guided into and out of sheave 84 to properly pass the cable from the storage drum 50 onto the traction drum 40.

Figures 7, 8, 9:
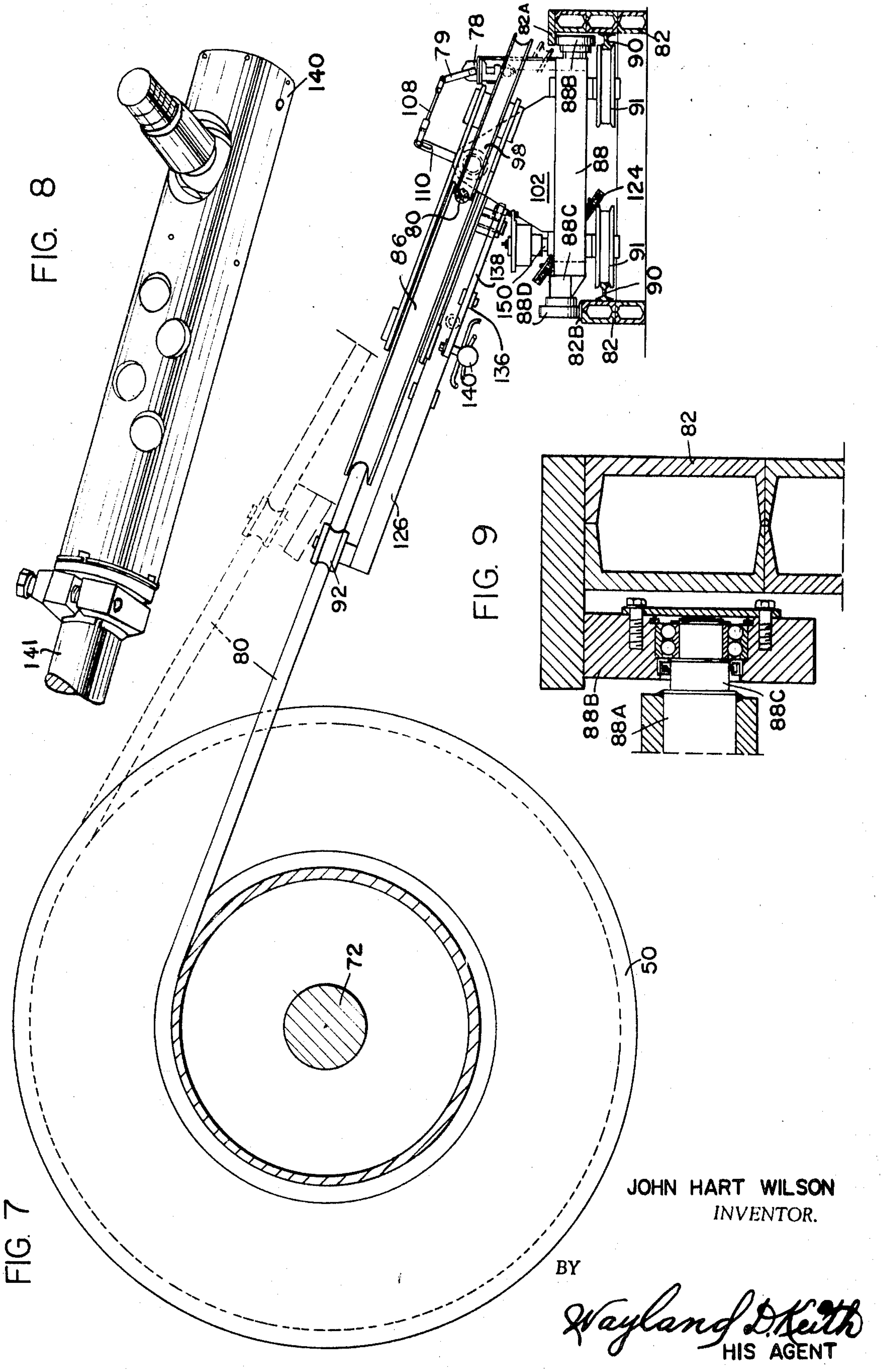
FIG. 7 is an enlarged sectional view taken on the line 7—7 of FIG. 1, looking in the direction indicated by the arrows, with the drum frame being omitted, alternate spooling positions of the cable being shown in dashed outline.
FIG. 8 is an enlarged perspective view of a valve for controlling the hydraulic fluid to a hydraulically actuated motor.
FIG. 9 is an enlarged sectional view of a portion of the frame of the level wind mechanism, showing a track thereon with a roller positioned thereagainst to maintain the carriage of the level wind mechanism in proper position.

As the cable winds onto storage drum 50, the carriage 88 will be moved back and forth to move the cable 80 from the position as indicated in full outline in FIG. 7, to that shown in dashed outline, to properly spool the cable onto storage drum 50. The movable carriage 88 has upstanding supports 102 thereon to pivotally mount a movable sheave support frame 104, on which support frame 104 and sheaves 86, 92, 98 and 100 are journaled, with the frame 104 pivoting about an axle 106. A variable pressure control valve 78 is mounted on frame 88 and has a lever 79 thereon which controls the mechanism within the valve to vary the pressure in accordance with the movement of lever 79. An adjustable linkage 108 pivotally connects the lever 79, of the variable pressure valve 78, with an upstanding apertured lug 110 mounted on pivoted frame 104, with the frame being movable about the axis of axle 106 as the height of the convolutions of the cable 80 vary on drum 50, which in turn will cause the valve 78 to vary the fluid pressure to conduit 68 leading to clutch 54 so as to present a substantially constant tension on cable 80 in accordance with the setting of variable pressure valve 78.

A fluid motor 112, which is preferably a hydraulic motor, is mounted on stationary frame 82 and drives through sprocket and chain arrangement 114 to drive a gear reduction unit 116 which has a sprocket 118 mounted on shaft 120. A chain 122 is anchored to one end of carriage 88 and passes around sprocket 118 and around sprocket 124, mounted on a shaft on stationary frame 82, with the chain 122 being anchored to the movable carriage 88, at the opposite end thereof, so, upon the rotation of sprocket 118 in one direction, the carriage 88 will be moved longitudinally along track 90 so the cable 80 winding onto the storage drum 50 will be guided, in side by side relation thereonto, or off of the drum in accordance with the use of the cable.

Figures 4, 5:
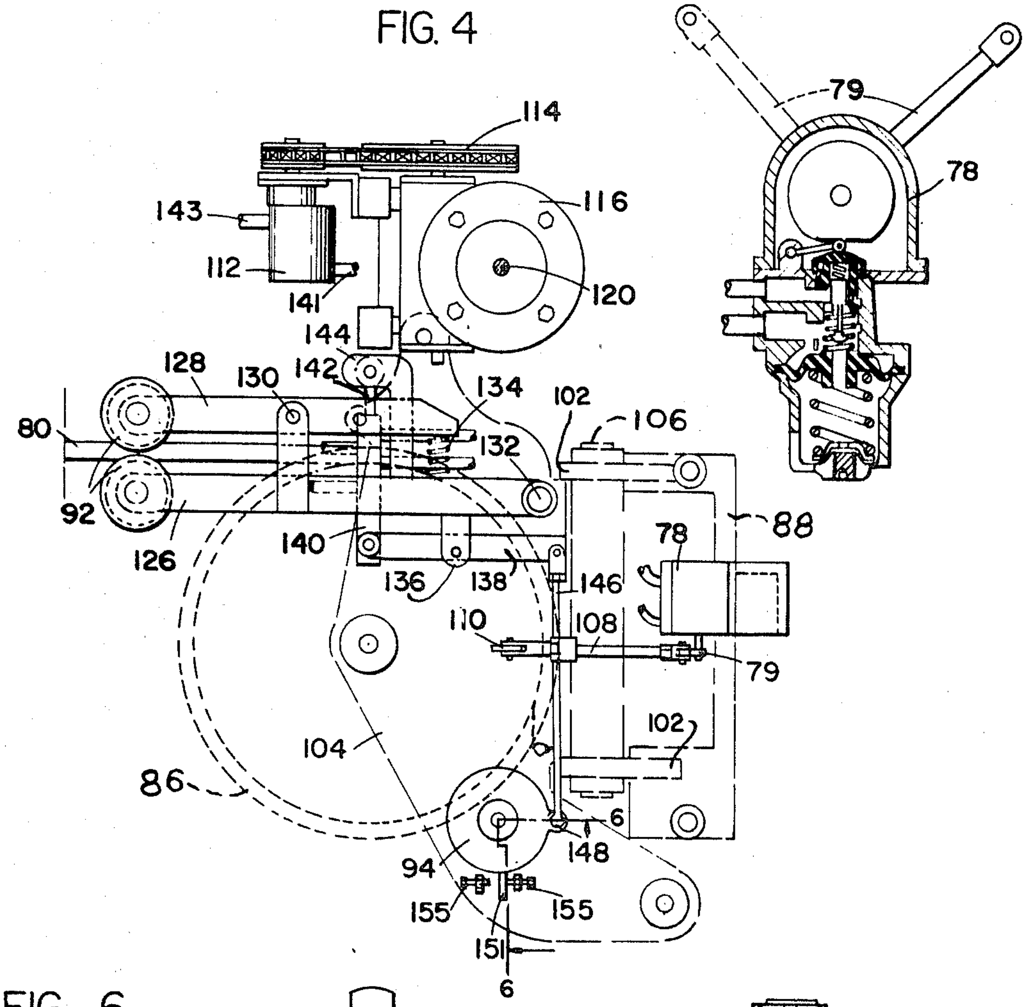
FIG. 4 is a top plan view of the sheaves which guide the cable onto the drum, showing the hydraulic mechanism associated therewith apart from the entire level winding mechanism.
FIG. 5 is a vertical sectional view through a variable pressure control valve for controlling air, to the clutch on the storage drum, in proportion to the position of a lever as determined by the layer of the cable being wound onto the storage drum.

Sheaves 92 are journaled on arms 126 and 128, which arms are mounted on movable frame 104. The arm 128 is pivotally connected to arm 126 by a pivot pin 130. The arm 126 is pivoted to movable frame 104 by pivot pin 132 with a spring 134 biased between arms 126 and 128 to urge sheaves 92 into contact relation with opposite sides of cable 80, as will best be seen in FIG. 4. An outwardly extending apertured lug 136 is secured to a side of the arm 126 and pivotally mounts an apertured lever 138, one end of which lever is pivotally connected to a hydraulic steering type valve body 140 at one end, with the plunger 142 of the hydraulic steering valve being pivotally connected to an apertured lug 144 which is secured to the opposite side of the arm 126. The lever 138 is pivotally connected at its opposite end to a linkage 146, which in turn is pivotally connected to an outstanding apertured lever 148 on the valve shift mechanism 94, which mechanism 94 is mounted on one of the shafts 150, with the body portion 152 of the mechanism being in journaled relation with respect to the shaft 150. A clutch plate 154 is secured to the shaft to cause a frictional drag, with respect to the body portion 152, which turns the body portion 152 arcuately until lug 151 engages the set screws 155 on movable support frame 104, which limits the arcuate movement of body portion 104, which varies the longitudinal movement of hydraulic valve 140 to control arms 126 and 128 to crowd the cable 80 against the previous convolution to the proper degree.

Figure 6:
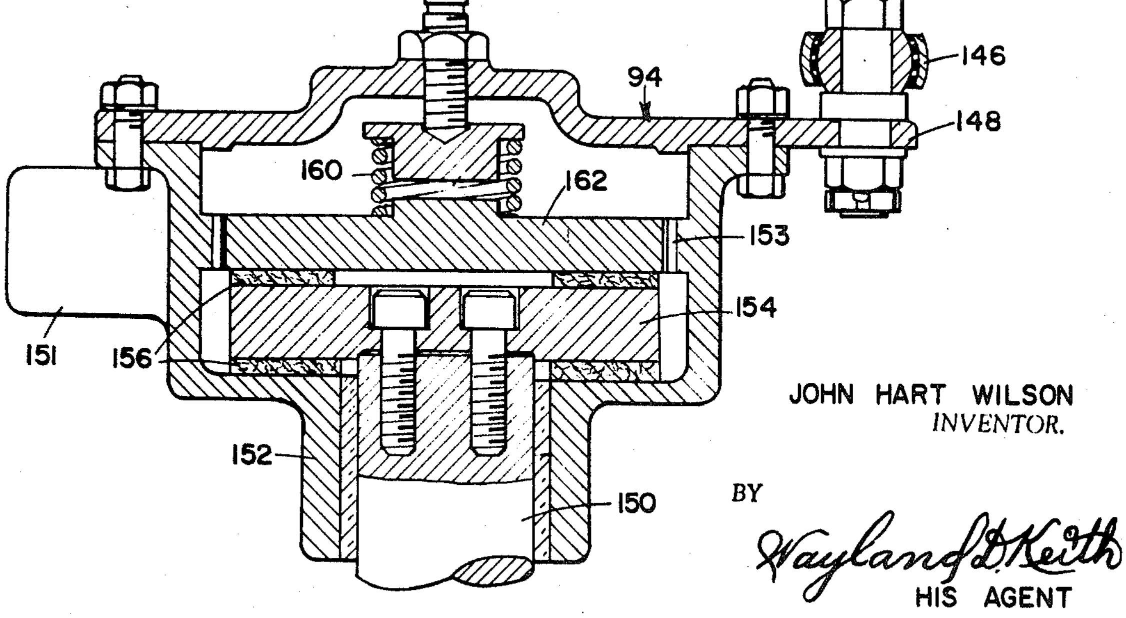
FIG. 6 is an enlarged sectional view taken on the line 6—6 of FIG. 4, looking in the direction indicated by the arrows.

Friction material 156 (FIG. 6) is provided intermediate the body portion 152 and the clutch plate 154, so upon tightening of adjustment screw 158 against tension of spring 106, a toothed plate 162, which complementally engages internal teeth 153 in body portion 152, will engage friction member 156 to cause a frictional drag between the plate 154 and the body portion 152. Therefore, when the shaft 150 is rotated, and upon one of the wheels 91 rolling in one direction, the shaft 150 will be rotated in the same direction to move the body 152 and lug 151 and lever 148 about the axis of the shaft 150, a predetermined degree, as determined by the space between adjustment screws 155, to move the linkage 146 in one direction which will shift the pivoted lever 138 to move the valve body 140, of the hydraulic power steering type valve with respect to plunger 142. This will cause a flow of hydraulic fluid to be directed from reservoir 164, FIG. 3 through conduit 166 into pump 168, thence, under pressure, to hydraulic valve body 140, and, with the valve in the proper position, fluid will be directed to the motor 112 to rotate the motor in one direction, which, through sprocket and chain arrangement 114 and gear reduction unit 116, will cause sprocket 118 to move chain 122 therearound.

Upon the initial movement of the carriage 88, to which the chain 122 is attached, the body portion 152 will be shifted, which in turn, through linkage 146, levers 138 and 126, will shift the sheaves 92 in a direction to cause the cable to lay in close relation to the preceding convolution, when winding in one direction, and upon moving the steering valve body 140 to another position, fluid will be directed from the pump 168 to the hydraulic motor 112 to rotate the motor in the opposite direction. This, in turn, will rotate the sprocket 118 to move the carriage 88 in the opposite direction and upon the initial movement of the carriage, the wheel 91, which is mounted on and secured to shaft 150, will turn the shaft 150, which through the friction engagement of clutch plate 154 with friction members 156, will move the body portion 152 about the axis of shaft 150, a limited degree, to move linkage 146 to shift the valve body 140 so that the arms 126 and 128 will urge the sheaves 92 to move the cable against the adjoining convolution in the opposite direction to cause the cable to spool smoothly onto the storage drum 50.

The sheave 100 is mounted on a pivoted lever 101 so by adjusting screwthreaded member 103, which is pivotally attached to the lever, the sheave may be adjusted with respect to cable 80.

It is preferable to have the frames 52, 82, 8 and 172 rigidly connected together as by bolts so as to form a composite unit when in operation, however, these frames may be separated as units so they may be easily handled for transportation and storage.

The groove of sheave 84 is in aligned relation with the cable coming off of traction drum sheave 40 in tangential relation so that the cable will pass from sheave 84 onto traction drums 40 and 42, so that a multiplicity of wraps of the cable 80 will pass over the grooves of drums 40 and 42 in side by side relation, with the end of the cable passing off of the groove on drum 42 on the opposite side from the groove on which it entered drum 40. The cable 80 passes from traction drum sheave 42 upward into an upright supporting derrick structure 173, used with rotary drilling rigs for drilling bore holes in the floor of the ocean from barges, drill ships or vessels.

Figure 14:
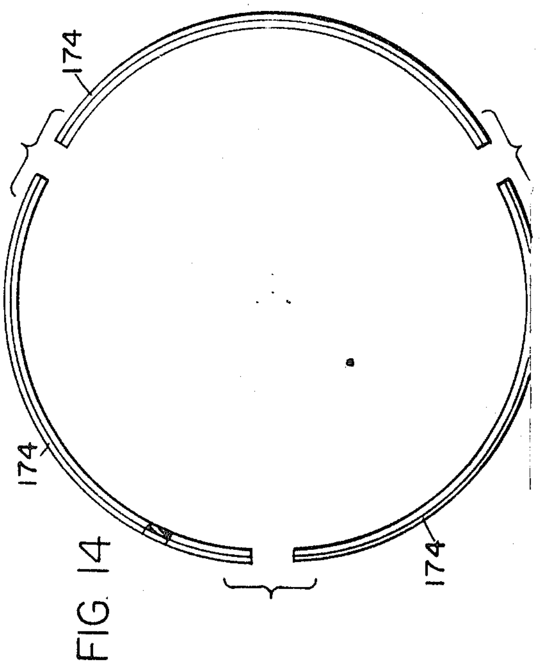
FIG. 14 is an exploded view of a segmental, elastomer ring which may be fitted on at least each of the first grooves of the traction drum, as shown in FIG. 12.
Figure 15:
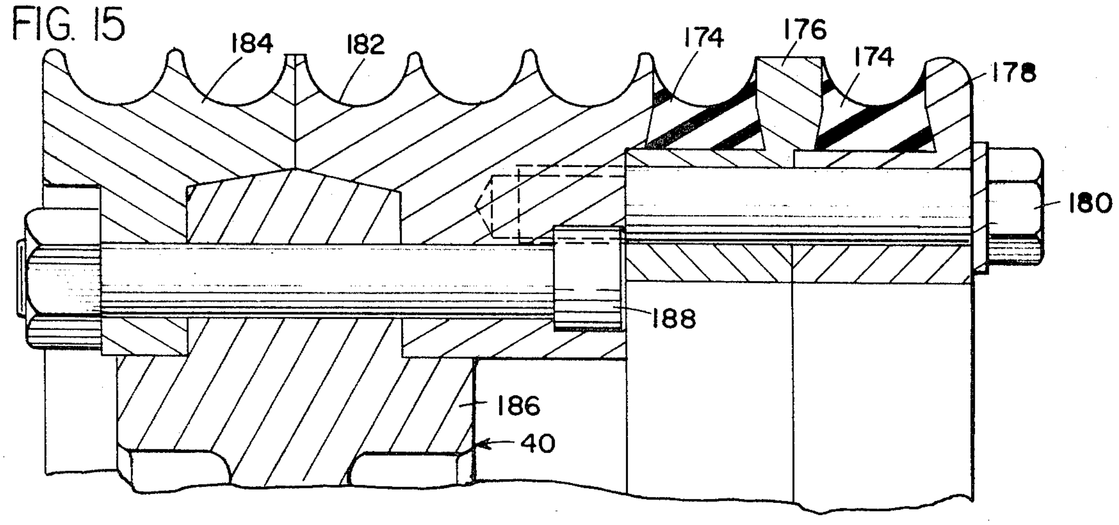
FIG. 15 is an enlarged fragmentary sectional view through a portion of a modified form of one of the traction drum sheaves and showing a plurality of elastomer elements within certain grooves of the sheave and showing the grooves attachably connected to the wheel portion of the sheave.
Figures 15A, 15B, 16:
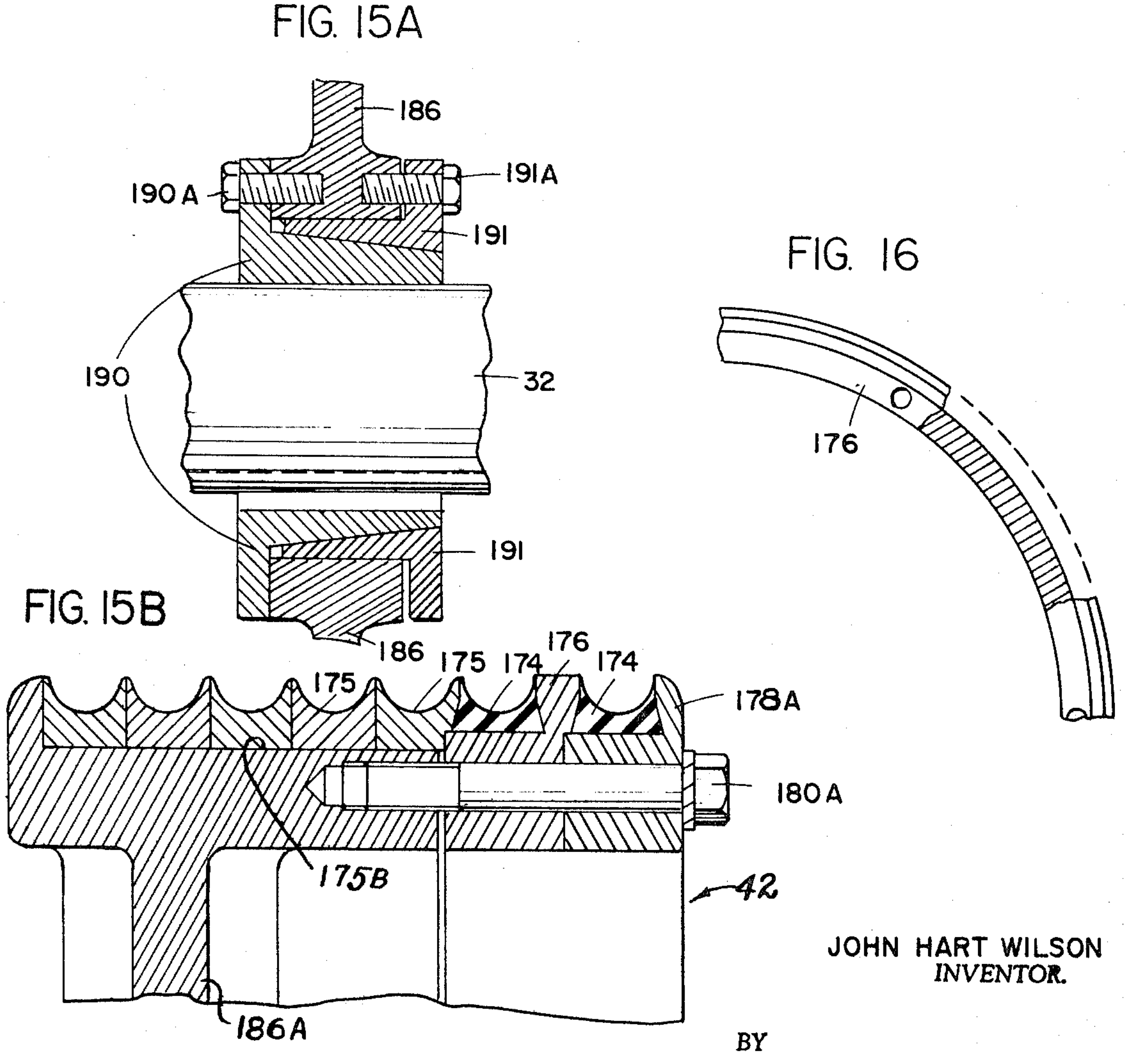
FIG. 15A is a fragmentary sectional view, on a reduced scale, through the hub of one of the traction drum sheaves.
FIG. 15B is a view similar to FIG. 15, but, on a reduced scale, of a further modified form of traction drum groove arrangement.
FIG. 16 is a fragmentary elevational view of one of the elastomer retainer rings on the traction drum sheave.

It is preferable to have the first one or two grooves of the traction drum sheaves 40 and 42, which receive the cable from storage drum 50, lined with a concave elastomer member, such as synthetic rubber or plastic, such as polyurethane or the like, as indicated at 174, and as will best be seen in FIG. 15. These members 174 may be made circular or in arcuate segments, FIG. 14, to fit within dovetail recesses between retainer rings 176 and 178, which retainer rings and elastomer members are held in fixed relation on the sheaves by bolts 180. The remaining annular groove members 182 and 184 of the sheave 40 are preferably metal and may be removably fitted on a wheel-like member 186 and secured thereto by bolts 188. The wheel-like members 186 may be retained on shafts 32 and 34 by a tapered hub arrangement 190 and 191, as shown in FIG. 15A, so that any of the grooved members 174, 182, 184, and the wheel-like members 186 may be readily removed and replaced.

The sheave 42 has grooves therein which are complementary to the grooves of sheave 40 for cable 80 to pass therearound, and the first two grooves of sheave 42 each have elastomer members 174 therein, however, grooved members 175 are annular and are fitted on a flat face 175B of a sheave wheel 186A, so when a bolt 180A is passed through an annular rim 178A and screwthreaded into wheel-like members 186A, the annular rim 178A causes the grooved members 174 and 175 to bindingly engage each other in side by side relation, which forms a slip clutch, so when torque is placed on the annular grooved members 175 to such extent that the cable 80 will slip, the faces of the grooved members 175 will slip between themselves and on the face 175B so as to maintain the tension all reaches of the cable between the traction drum sheaves 40 and 42 substantially uniform and taut, which prevents wear on the cable and enables greater pulling to be had with the traction drum sheave arrangement. With the grooved members 175 made in this manner, these may be readily replaced, should they become worn, by removing bolt 180A and annular rim 178A, and replacing the worn grooved members 175 with members which are not worn.

Figure 20:
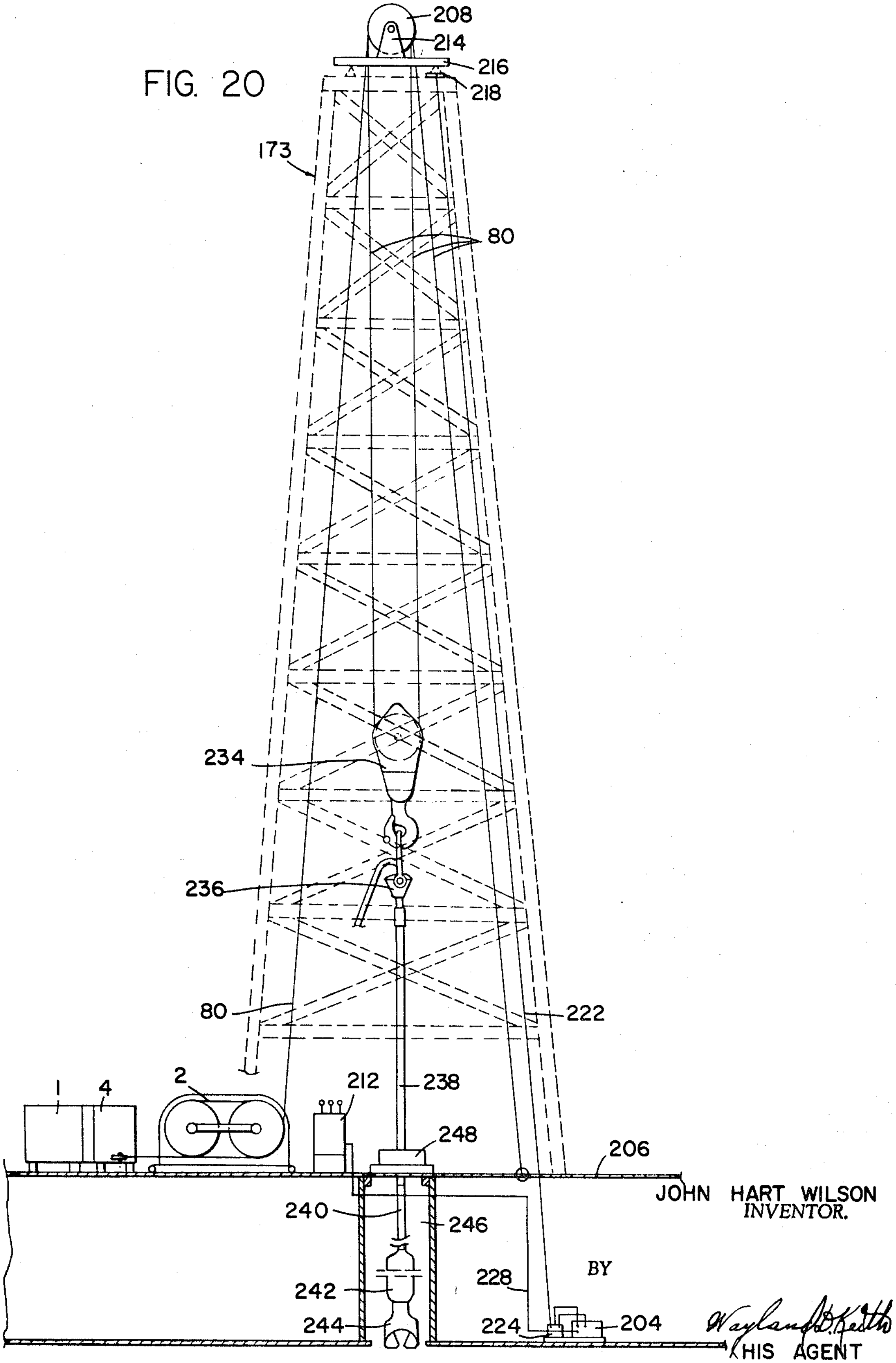
FIG. 20 is an elevational view of a drilling rig mounted on a barge, drill ship or vessel, which drilling rig uses a traction drum winching mechanism and showing diagrammatically, a weight sensor associated therewith, the upright supporting derrick structure being shown in dashed outline.

The above form of the invention has been described as using one motor 10, which drives through clutch 20, which clutch 20 is of the water cooled, air actuated type as shown in my co-pending application, Ser. No. 713,094, for Method of and Apparatus for Maintaining a Constant Tension on the Drill Pipe of a Rotary Drilling Rig From a Floating Platform or the Like, which clutch is controlled by a pressure controlled sensing actuator 204, as shown in FIGS. 21 and 22, which is associated with derrick 173, FIG. 20.

The upright supporting derrick structure 173 is supported on a deck or base structure 206 of the barge or drill ship, which barge or drill ship may support the traction drum winching mechanism which is driven by the prime mover unit 1, as hereinbefore set out. The drilling rig is provided with a control console 212 from which to control the various operations of the rig. The cable 80 leads from the traction drum winching mechanism 2, which cable 80 passes over sheaves 208 on crown block 214, which crown block has a portion of the weight thereof supported on a pivoted lever 216 on the top of the derrick 173, so as to transmit a proportionate amount of weight to a transducer 218 through a piston element 220. The transducer 218 will transmit pressure through fluid conduit 222 to a transducer pressure receiver 224, which transducer pressure receiver will actuate pressure control sensing actuator 204, which has fluid control valves therein, to direct fluid, under pressure, from a fluid supply conduit 226 into and through conduit 228 and multiple position switching valve 232 to the stationary portion of rotary seal 230 on clutch 20, or to clutch 20A or both or to an off position as desired. Switching to clutch 20 enables the motor 10 to drive through countershaft 22 and through low speed sprocket and chain arrangement 24 to drive shaft 16, if the clutch 23, associated with the sprocket on shaft 16 which drives sprocket and chain arrangement 24, is engaged. However, with the above sprocket and chain arrangement in driving relation, the clutch 23, associated with the sprocket on shaft 16 which drives the high speed sprocket and chain arrangement 24A to drive shaft 16, is disengaged, in a manner well known in the art of transmissions.

The pressure controlled sensing actuator is interposed between conduits 226 and 228, with the conduit 228 leading to a switching valve 232 which enables switching the pressure either to clutch 20 or to clutch 20A or the sensing actuator may be moved to a position to enable the clutches 20 and 20A to be simultaneously actuated at a pressure as controlled by the pressure controlled sensing actuator 204, which enables either one, two or three motors of the prime mover unit 1, to be used, or the valve may be moved to a position to disengage both clutches.

Each of the clutches 20, 20A and 54 is a fluid cooled in the manner set out in the above named co-pending application Ser. No. 713,094. The cooling fluid as entering and leaving the respective inlets may be from any suitable source and may be a fluid, such as water. The same is true of the fluid inlets of the fluid cooled brakes 70 and 192.

The shafts 32 and 34 have brake drums 32A and 34A respectively thereon, which brake drums are engageable by brake bands in a manner well understood in the art of brakes, and the mechanism for operation of these brakes is considered conventional and has not been shown, so as to simplify the showing of the present invention.

An air actuated, fluid cooled, disc type brake 192 is mounted on the drive shaft 16 and the body portion thereof is anchored against rotation, as by yoke 194, so upon air, under pressure, being directed into conduits 196, by valve (not shown), which preferably is a variable pressure valve, braking to a desired degree is effected on the drive shaft 16, which holds or retards the rotation of gear 26 which interengages gears 28 and 30, which gears are mounted on the respective shafts 32 and 34 to hold or retard the rotation of traction drum sheaves 40 and 42. A cooling fluid, such as water, is directed into the conduit 200 and out through conduit 202 to maintain the brake at an operating temperature below which the friction elements thereof will be damaged.

MODIFIED FORM OF A TRACTION DRUM WINCHING MECHANISM

Figure 10:
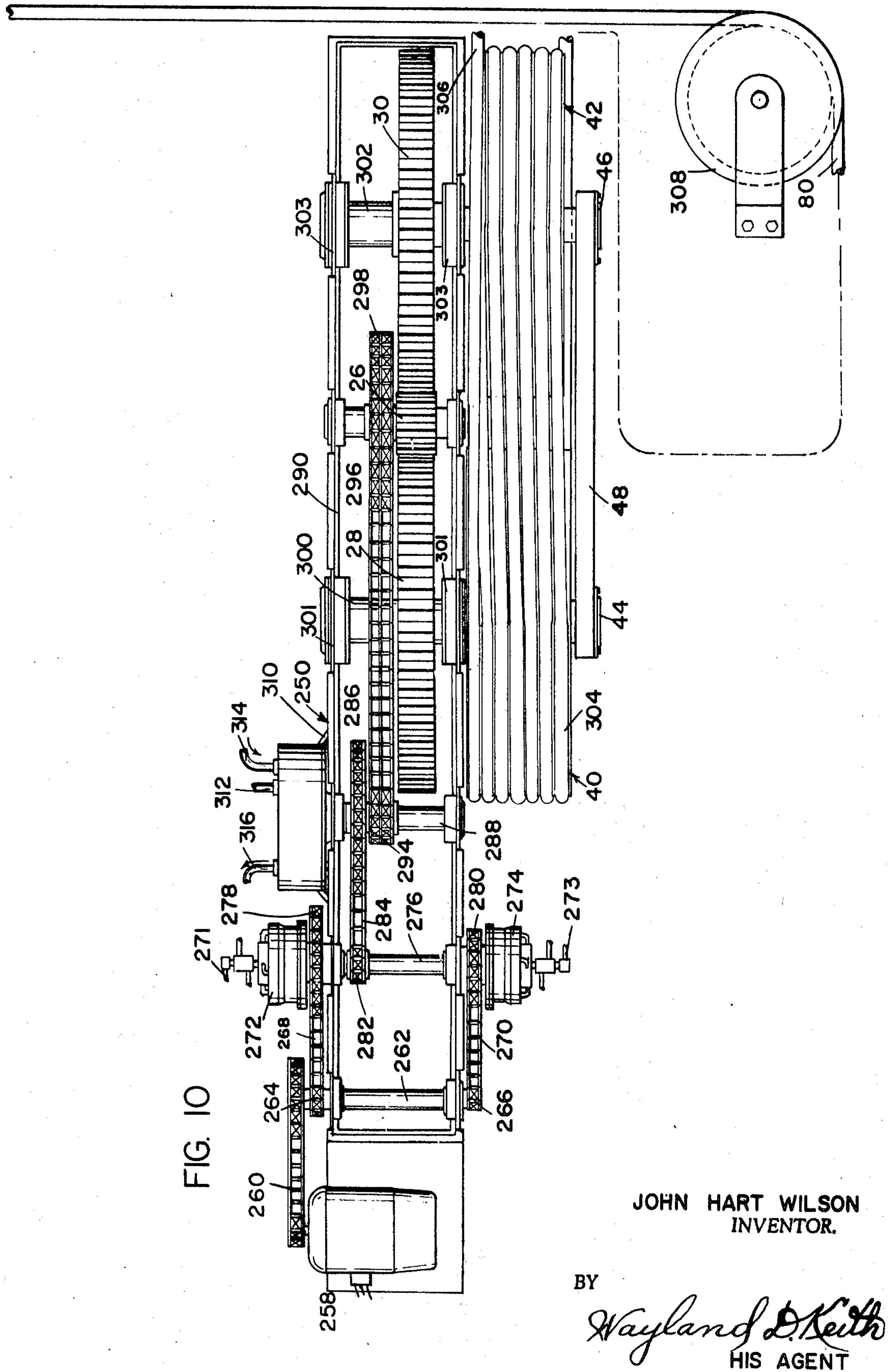
FIG. 10 is a top plan view of a modified form of a traction drum and drive mechanism, showing the cover of the gear housing being removed, parts being shown in off-set relation to more clearly bring out the details of construction.
Figure 11:
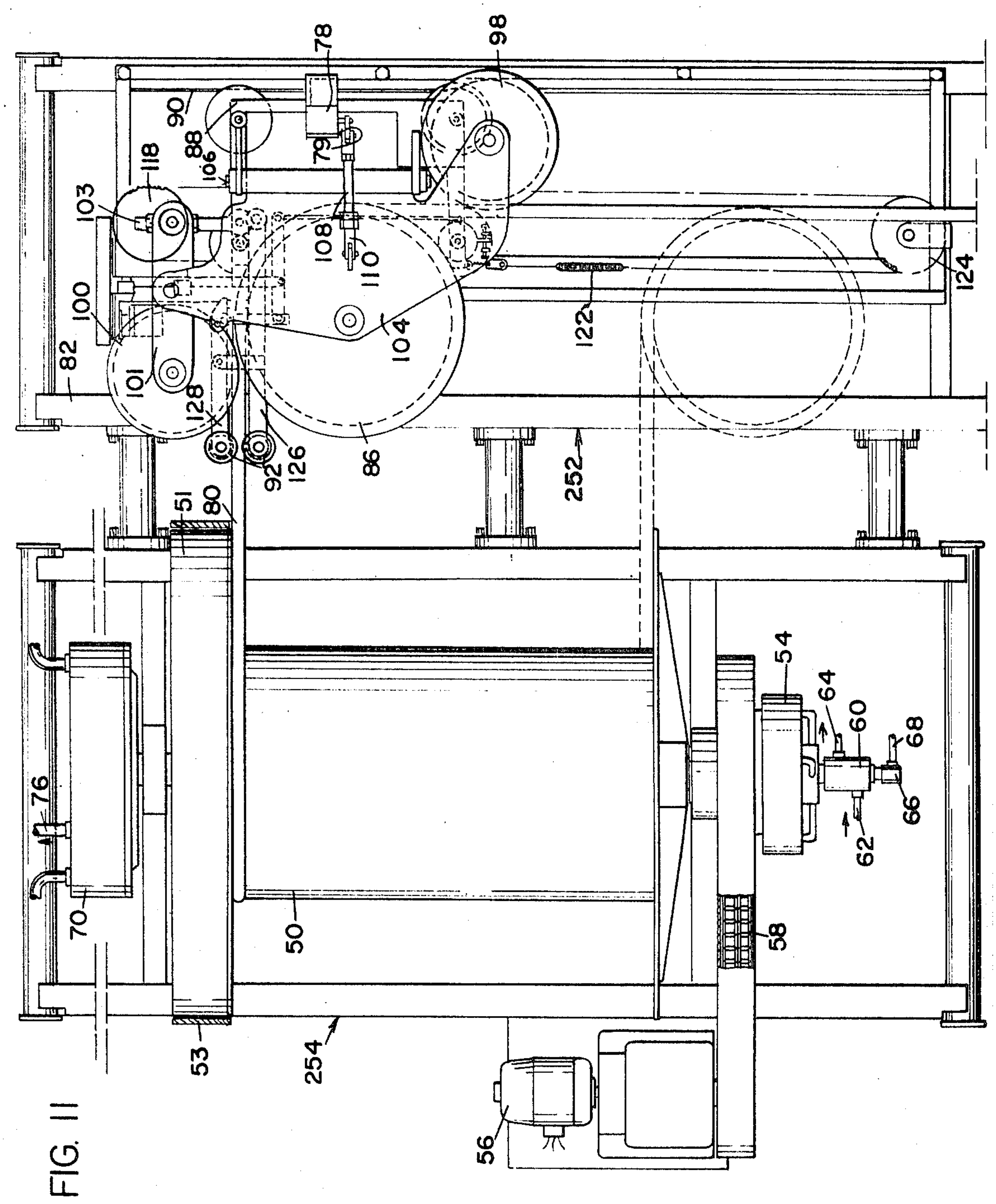
FIG. 11 is a top plan view of the level winding mechanism and cable storage drum and drive mechanism as associated with the modified form of the traction drum, showing the cable extending toward the traction drum.
Figure 12:
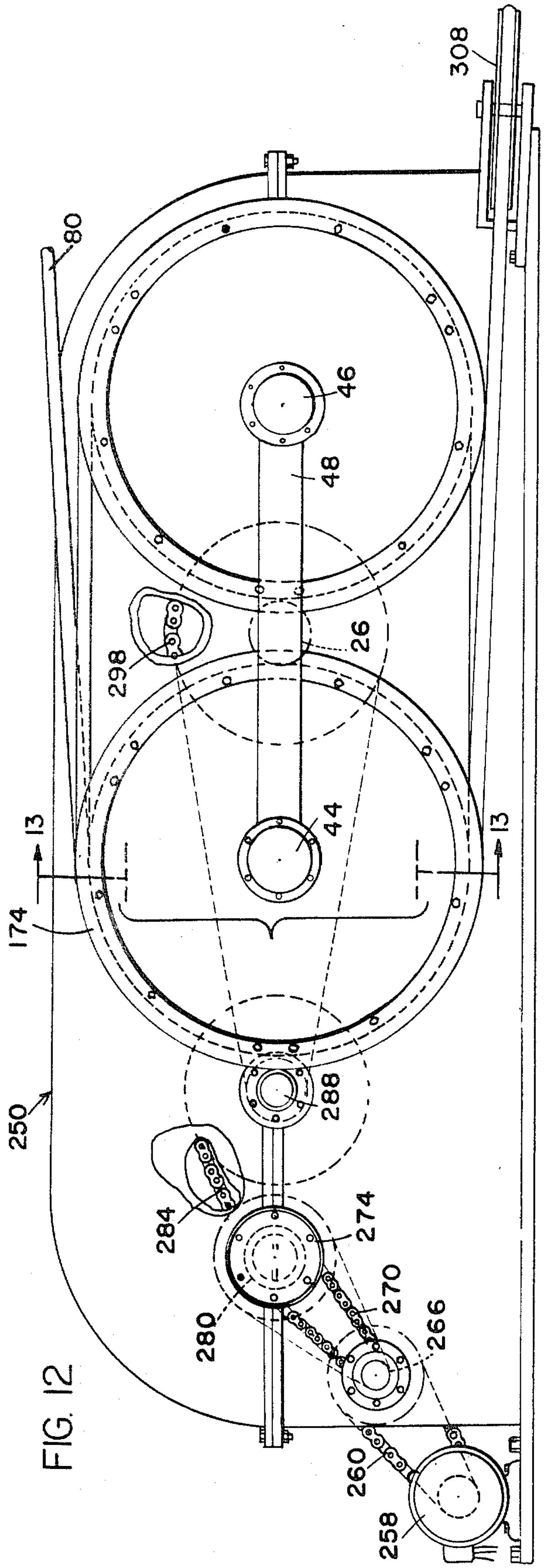
FIG. 12 is a side elevational view of the traction drums, as shown in FIG. 10, showing the drive mechanism connected therewith, and showing a cable leading from the storage drum thereto and leading from the traction drum to the load being acted upon, with portions being broken away to bring out the details of construction.
Figure 13:
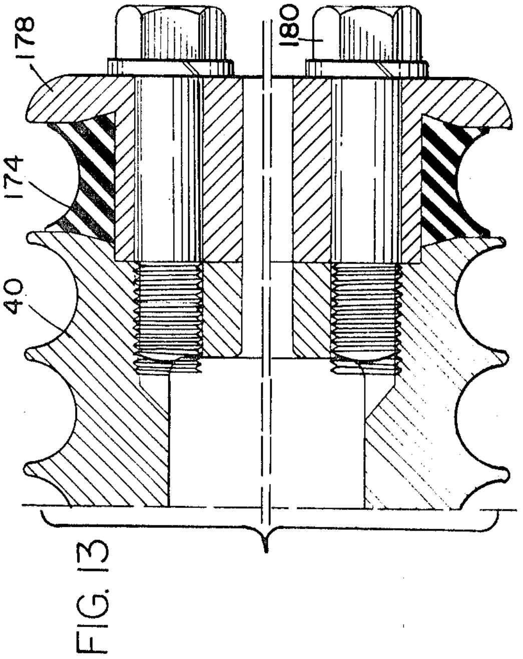
FIG. 13 is an enlarged sectional view taken on the line 13—13 of FIG. 12, looking in the direction indicated by the arrows.

A modified form of the traction drum switching mechanism is shown in FIGS. 10 through 12, and all numbers that designate like parts are considered the same as for the aforementioned form of the invention, however, such parts as are not comparable to the aforementioned form of the invention carry different numbers.

The present form of the invention comprises three units with a numeral 250 designating the traction drum winching mechanism unit, as shown in FIG. 10, which includes a power unit 258 and change gear mechanism 268 and 270 for driving the traction drums 40 and 42. The numeral 252 designates a level wind mechanism, which is comparable to the level wind mechanism designated as 4 in the aforementioned form of the invention, and the cable storage drum unit designated generally by the numeral 254 is comparable with the cable storage drum unit designated generally by the numeral 6 in the aforementioned form of the invention.

The traction drums 40 and 42 are driven by the power unit 258, such as a motor which drives through an endless transmission mechanism 260, such as a sprocket and chain arrangement to a jack shaft 262 on which low and high speed sprockets 264 and 266 are mounted. These sprockets drive through chains 268 and 270, respectively, to drive clutches 272 and 274 to selectively drive a countershaft 276 in the desired gear ratio, as the clutch 272 carries a larger sprocket 278 and the clutch 274 carries a smaller sprocket 280. A sprocket 282 is mounted on and secured to countershift 276 and drives through a chain 284 to a sprocket 286 on brake shaft 288. The brake shaft is journaled in a housing 290 in which shafts 262, 276, 288 and pinion gear shaft 292 are journaled. A sprocket 294 is mounted on and secured to brake shaft 288 and drives through chain 296 to drive a sprocket 298 mounted on and secured to pinion gear shaft 292.

A pair of shafts 300 and 302 are journaled within the respective bearings 301 and 303 in housing 290, which shafts are parallel to shaft 292, which shaft 292 mounts a pinion gear 26, which is secured thereto. The pinion gear is in mesh with gears 28 and 30 mounted on and secured to the respective shafts 300 and 302. The shaft 300 has a traction drum 40 mounted on and secured thereto for rotation therewith and the shaft 302 has a traction drum 42 mounted thereon and secured thereto and rotatable therewith so, as the pinion gear 26 rotates gears 28 and 30 in either direction, the traction drums 40 and 42 will be rotated in unison. The shaft 300 of the traction drum 40 has a bearing 44 on the outer end thereof and the shaft 302 of the traction drum 42 has a bearing 46 on the outer end thereof, which bearings are mounted in a spreader beam 48 which holds the bearings in proper spaced apart relation.

It is to be pointed out that the annular grooves in traction drum 40 are offset approximately one-half the width of the grooves with respect to alignment with the annular grooves in traction drum 42 so the cable 304 passing therearound will be fed from one traction drum to the other with a minimum of wear on the cable 304. The form of the traction drum winch as shown in FIGS. 10 and 12, may be used to maintain a predetermined constant tension on a cable for various uses, one of which uses includes cable connected to ship anchors and when a multiplicity of such winches and anchors are used, the tension of cable 304 against an anchor, such as a deep sea anchor or other object which is not readily movable, a drilling barge, drill ship or vessel may be maintained substantially stationary, vertically, with respect to a particular location over the floor of the ocean, such as a bore hole of a well being drilled. With the proper amount of air pressure impressed on clutch 272 or clutch 274 through air supply line 271 or 273, the cable 304 on the traction drums 40 and 42 will be payed out or reeled in, in uniform fashion so that a minimum of lateral movement of the drill ship, or the like, will occur.

In the arrangement shown in FIGS. 10 and 11, the cable 304 to the level winding mechanism 252 passes over sheave 308 to sheave 86 on the level winding device 252, which in turn, directs the cable 304 onto the storage drum 50 at substantially a right angle to the drum. The storage drum 50 can be at any convenient location with respect to the traction drum sheaves 40 and 42, either on the same level or on different levels and arranged in suitable angular relation with respect thereto. The anchor (not shown) is connected to the fairlead end 306 of the cable 304 with the opposite end of the cable passing around a guide sheave 308 and through the level wind mechanism designated generally at 252, in a manner afore set out for the level wind 6, and thence onto cable storage drum 50 of cable storage drum unit 254, which cable is wound onto the cable storage drum in side by side relation at a constant tension delivered through variable torque produced by clutch 54 which is driven by motor 56. The traction drums 40 and 42 may have concave elastomer lining members 174 fitted in the first groove or the first two grooves of the respective traction drums 40 and 42 that directs the cable 304 to the storage drum 50. The elastomer lining members 174 may be annular and in one piece, or they may be made up of arcuate segments, as shown in FIG. 14.

The traction drum sheaves 40 and 42 are preferably made to be readily removed from the shafts 300 and 302 by removing tapered hub arrangement 190 and 191, as shown in FIG. 15A, which hubs are held in place by bolts 190A and 191A. A fluid cooled, fluid pressure actuated disc type brake 309 is positioned on brake shaft 288 and the outer portion thereof is secured in nonrotatable relation with respect to the housing 290, as by bracket or torque arm 310, so upon application of air through air supply pipe 312, the brake may be engaged to the desired degree and slipped continuously, as it is cooled by fluid passing into inlet conduit 314 and out through conduit 316 to maintain the friction elements therein at a temperature below that at which the friction elements will be damaged, or a predetermined tension may be put on the brake by a predetermined air pressure and the brake will not slip until the pull thereon exceeds the setting of the brake, in this manner the brake may be set to slip at a load which will approach, but not reach, the breaking limit of cable 304.

Reference is had to the aforementioned description with respect to the level winding device and for the sake of brevity, the detailed description thereof is not repeated here. Furthermore, description with respect to the fluid cooled, fluid pressure actuated clutch 54, as well as the fluid cooled, fluid pressure actuated brake 70, is not repeated here, nor the description and operation of the cable storage drum 50.

A STILL FURTHER MODIFIED FORM OF THE TRACTION DRUM WINCHING MECHANISM FOR DRILLING RIGS MOUNTED ON DRILL SHIPS AND THE LIKE

A still further modified form of the traction drum winching mechanism for drilling rigs, drill ships and the like, is shown in FIGS. 17, 17A, 18 and 19, wherein the power unit comprising a plurality of prime movers, a change speed transmission and pressure controlled slip clutches, interposed between the prime movers, and a drive shaft for a traction drum is designated generally by the numeral 401, which is substantially identical in construction with the power unit 1 of the form of the invention as shown in FIGS. 1 through 9 and has the same application and the same numbers will be used for corresponding parts.

The traction drum winching mechanism is designated by the numeral 402, which is substantially identical with the traction drum winching mechanism 2 in the aforementioned form of the invention and the corresponding parts will carry corresponding numerals. The level winding mechanism 404 is a hydraulically actuated level winding mechanism and is similar to the level winding mechanism 4, described in the aforementioned form of the invention, except the level winding mechanism 404 is moved longitudinally on a track with a cylinder plunger arrangement instead of a hydraulic motor and chain drive arrangement. A cable storage drum mechanism is designated generally by the numeral 406, which is identical with the form of the invention as shown in FIGS. 1 through 9, and like numbers for the corresponding parts will be used for the sake of brevity and to simplify the description.

As the cable 80 passes from traction drum sheave 40 onto a sheave 84 in the level winding unit 404, the cable 80 is directed parallel with the axis of the storage drum 50 onto and around a sheave 86, which cable 80 is held within the groove of sheave 86 by groove sheaves 98 and 100 which insures that the cable will pass off of sheave 86 onto storage drum 50 so that the cable 80 will be at substantially right angles to the surface of the drum on which the cable is being wound. As the cable 80 is being wound onto storage drum 50, a plunger 408, which is mounted in hydraulic cylinder 410, is secured to movable carriage 88 and the opposite end of cylinder 410 is secured to stationary frame 82. The plunger 408 moves the movable carriage 88, mounted on wheels 91, back and forth on parallel tracks 90 on stationary frame 82.

Figure 17:
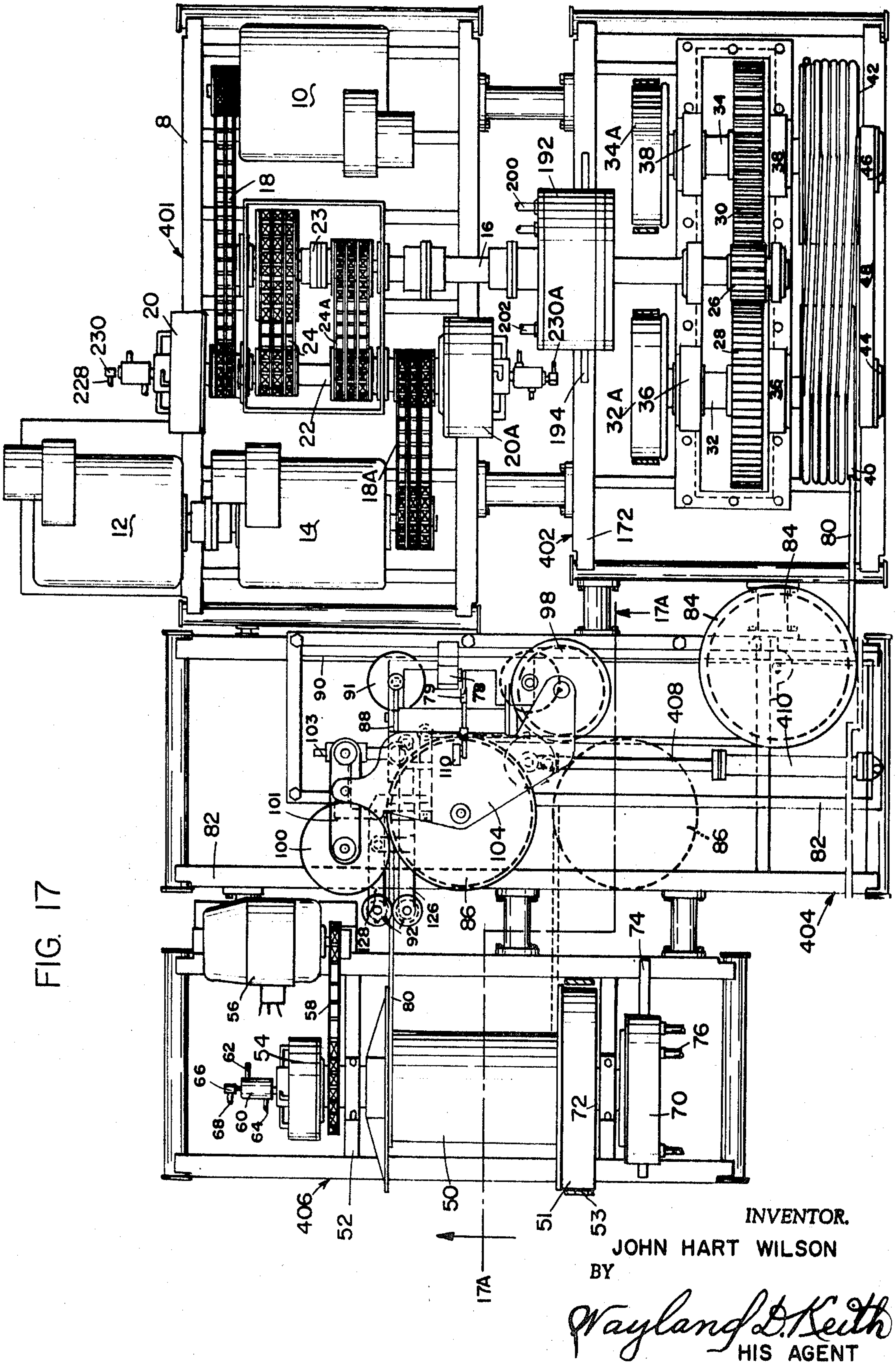
FIG. 17 is a view similar to FIG. 1, but of a further modified form of the invention, which utilizes a hydraulic cylinder plunger arrangement to shift the level winding mechanism back and forth to spool the cable onto the storage drum.
Figure 17A:
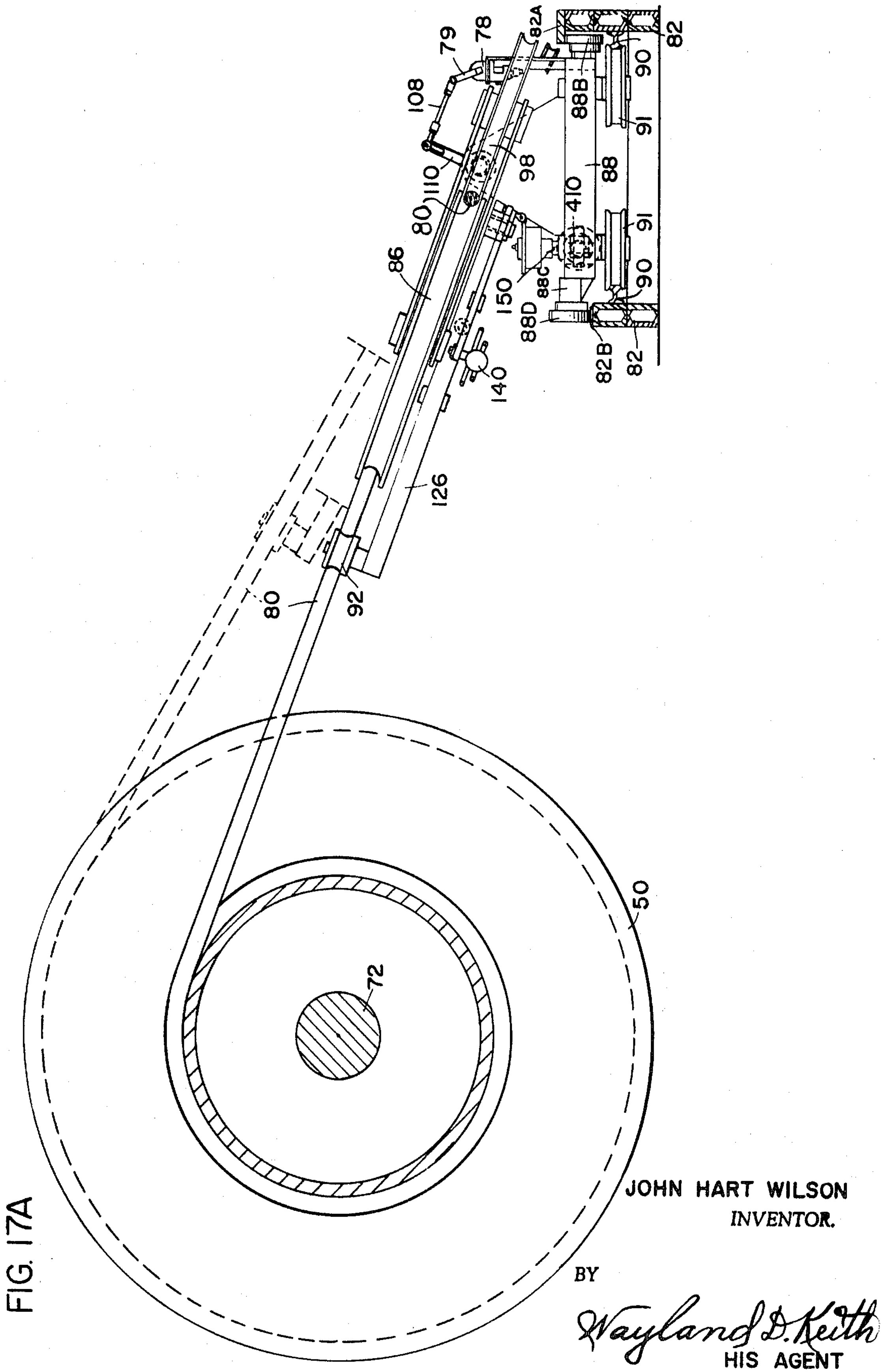
FIG. 17A is a view similar to FIG. 7, but taken on line 17A—17A of FIG. 17, looking in the direction indicated by the arrows, but with certain parts omitted to show detailed construction.
Figures 18, 19:
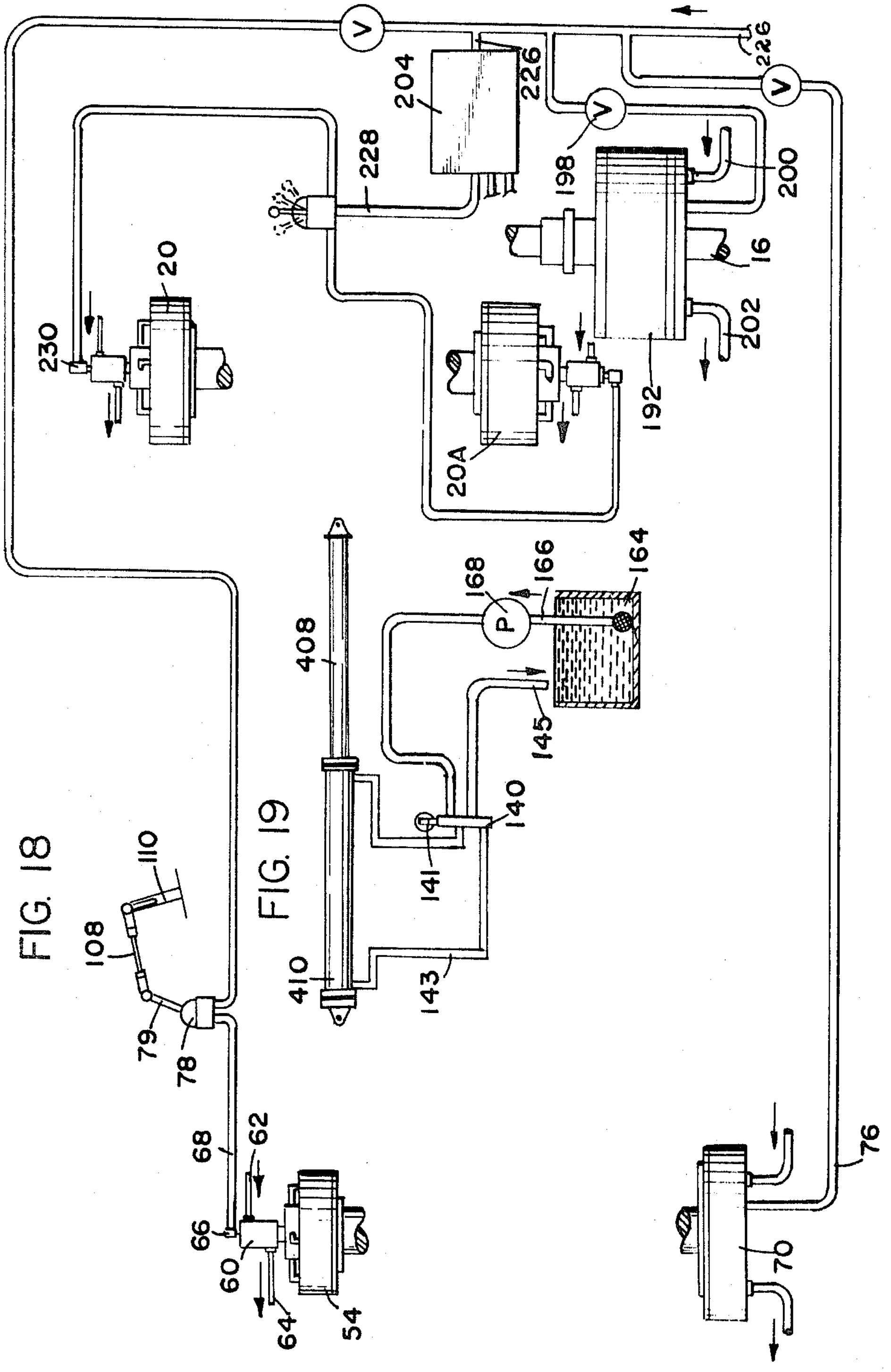
FIG. 18 is a view similar to FIG. 2, but for the fluid actuated clutches and brakes to control the form of the invention as shown in FIG. 17.
FIG. 19 is a view similar to FIG. 3, but of the hydraulic system to control a reciprocating hydraulic cylinder-plunger arrangement.

The movable carriage 88, FIGS. 17 and 17A, is of the same construction as the carriage shown in the form of the invention illustrated in FIGS. 1 through 9, except the respective conduits 141 and 143, which lead from the hydraulic switching valve body 140, lead to opposite ends of cylinder 410, so upon hydraulic fluid being withdrawn from reservoir 164 into conduit 166 by pump 168, and with the plunger 142 of the hydraulic switching valve in one position in the body 140, hydraulic fluid will be directed to one end of cylinder 410 which will move the plunger 408 in one direction to discharge hydraulic fluid from the opposite end of cylinder 410 through body 140 of the hydraulic switching valve and back into reservoir 164. With the plunger 142 in another position with respect to the valve body 140, the hydraulic fluid will be directed into the opposite end of the hydraulic cylinder 410 to move plunger 408 in the opposite direction and the hydraulic fluid in the opposite end of the hydraulic cylinder 410 will be discharged out through body 140 of the hydraulic switching valve into conduit 145 and into the reservoir 164. This arrangement will move the carriage 88 longitudinally back and forth on rack 90 when switched at each end of the stroke in spooling cable 80 onto the storage drum 50.

To accomplish the switching and the proper crowd angle, a movable frame 104 is pivotally mounted on movable carriage 88, which frame 104 has an arm 126 pivoted thereto by pivot pin 132 and arm 128 is pivoted to arm 126 by pivot pin 130, with a spring 134 biased between the arms 126 and 128 on the ends thereof opposite cable guide sheaves 92 to hold the sheaves in binding engagement with the opposite sides of cable 80.

The hydraulic power steering type valve, comprising valve body 140 and plunger 142, for switching the hydraulic fluid alternately to conduits leading to hydraulic motor 112 and to opposite ends of the hydraulic cylinder 410 for reciprocating plunger 408 thereof, is of the character as disclosed in patents to Robert A. Garrison, No. Re. 23,867, reissued Sept. 14, 1954, and Pat. No. 2,824,-447, issued Feb. 25, 1958, as manufactured by the Garrison Manufacturing Co. of Los Angeles, California, therefore, no detailed description of the internal construction thereof is given herein.

When the carriage 88 has moved longitudinally along the length of storage drum 50 and the cable 80 engages an end flange of the storage drum and starts winding an additional layer of cable on the storage drum in the opposite direction, will cause carriage 88 to reverse movement thereby causing wheels 91, attached to shaft 150 and engaging stationary frame 82, to reverse rotation which will cause shaft 150 attached thereto to rotate in the opposite direction, which will cause the housing 154, which is frictionally connected to shaft 150, to move arcuately. The housing 152 and valve shift mechanism 94 will be shifted an arcuate amount as determined by lug 153 moving between adjustment screws 155. The housing 152, which is in frictional engagement with clutch plate 154, will cause the linkage 146 to shift the distance as determined by the movement of lug 153 between adjustment screws 155.

Upon movement of linkage 146, lever 138 will be moved to move the body 140 of hydraulic switching power steering type valve, and with the plunger 142 of the valve connected to outstanding lug 144, the pivoted arm 126, together with arm 128 associated therewith, will urge cable guide sheaves 92 against cable 80 to hold cable 80 against the preceding convolutions of cable on the storage drum 50, but with a crowd angle exerted on the cable being so spooled so as to maintain the cable in proper, tightly spooled relation on the storage drum 50.

The hydraulic cylinder and plunger arrangement 410 and 408 will urge the carriage 80 along track 90 to move the cable guide sheaves 92 to propperly spool the cable in side by side relation onto storage drum 50, with the variable pressure valve 78 varying the pressure to clutch 54, so as to maintain a substantially constant tension on cable 80, which is being wound onto storage drum 50, at a tension less than that being exerted on the cable in pulling the load by the traction drums 40 and 42. In this manner, the cable 80 in wound onto the storage drum 50 in proper relation and without damage to the cable.

This form of the invention utilizes the same weight sensing controls for drilling rigs as described for the first mentioned form of the invention and as particularly shown in FIGS. 18, 20, 21 and 22.

The upright supporting derrick structure 173 has the cable 80 anchored thereto at a suitable anchor point on the base of upright supporting derrick structure 173 so that the traveling block 234 will be supported by cable 80, which traveling block supports swivel 236, which swivel supports a Kelly 238 to which a drill pipe 240 is attached. The drill pipe 240 has the usual drill collars 242 thereon, and a bit 244 for drilling the bore hole 246. A rotary table is indicated at 248 to rotate the Kelly 238. A conduit 222 leads from transducer 218 to the transducer pressure receiver 224, as hereinbefore set out.

Having thus clearly shown and described the invention, what is claimed as new and desired to be secured by Letters Patent is:

1. An apparatus for performing a winching operation, which apparatus comprises:
(a) a traction drum winching mechanism having a pair of gear driven, grooved traction drums mounted for rotation about respective axes, to receive loops of cable therearound, and to pay out and reel in cable,
(b) a prime mover connected in driving relation with the traction drum winching mechanism,
(c) a cable storage drum associated with said traction drum winching mechanism,
(d) a level winding mechanism interposed between said traction drum winching mechanism and said storage drum for directing cable off of the traction drum winching mechanism and onto the storage drum,
(e) a power unit associated with said cable storage drum,
(f) a clutch interposed between said power unit and said cable storage drum to selectively engage said power unit in driving relation with said storage drum,
(g) gearing interposed between the prime mover and said traction drum to selectively drive said traction drum winching mechanism in geared relation,
(h) said level winding mechanism having a stationary frame,
  (1) a movable carriage associated with said stationary frame and being movable longitudinally with respect thereto,
(i) a cable sheave mounted on said movable carriage to receive the cable from said traction drum and direct the cable onto the cable storage drum at substantially a right angle to the axis of the cable storage drum,
  (1) power means on said stationary frame of said level winding mechanism operatively connected to said movable carriage to move said carriage longitudinally of said stationary frame and parallel to the axis of said cable storage frame,
(j) said clutch which is interposed between said power unit and said cable storage drum being a slip type clutch, and
(k) means associated with said level winding mechanism and said clutch to slip said clutch to maintain a substantially constant tension on said cable being spooled on said cable storage drum.

2. An apparatus for performing a winching operation, as defined in claim 1; wherein
(a) said means associated with said level winding mechanism to maintain a substantially constant tension on said cable is a variable pressure control valve,
(b) said clutch being a fluid actuated clutch,
  (1) conduits connecting said variable pressure control valve and said clutch in fluid communication, and
  (2) fluid supply means to supply fluid, under pressure, to said variable control valve, to impress pressure on said fluid actuated clutch, to maintain a substantially constant tension on the cable being wound onto the cable storage drum.

3. An apparatus for performing a winching operation, as defined in claim 1; wherein
(a) said variable pressure control valve associated with said level winding mechanism has one portion thereof mounted on said movable carriage,
(b) a movable frame pivotally mounted on said movable carriage,
(c) cable guide means mounted on said movable frame and being movable with respect to the axis of said cable storage drum, as the cable builds up in layers on said cable storage drum, and
(d) connecting means interconnecting a portion of said variable pressure control valve on said movable carriage and said movable frame to vary the pressure passing through said variable pressure control valve to said fluid actuated clutch, in accordance with the layers of cable on said cable storage drum.

4. An apparatus for performing a winching operation, which apparatus comprises:
(a) a traction drum winching mechanism having a pair of gear driven, grooved traction drums mounted for rotation about respective axes, to receive loops of cable therearound, and to pay out and reel in cable,
(b) a prime mover connected in driving relation with the traction drum winching mechanism,
(c) a cable storage drum associated with said traction drum winching mechanism,
(d) a level winding mechanism interposed between said traction drum winching mechanism and said storage drum for directing cable off of the traction drum winching mechanism and onto the storage drum,
(e) a power unit associated with said cable storage drum,
(f) a clutch interposed between said power unit and said cable storage drum to selectively engage said power unit in driving relation with said storage drum, (g) gearing interposed between the prime mover and said traction drum to selectively drive said traction drum winching mechanism in geared relation, (h) said level winding mechanism having a stationary frame, (1) a movable carriage associated with said stationary frame and being movable longitudinally with respect thereto, (i) a cable sheave mounted on said movable carriage to receive the cable from said traction drum and direct the cable onto the cable storage drum at substantially a right angle to the axis of the cable storage drum, (1) power means on said stationary frame of said level winding mechanism operatively connected to said movable carriage to move said carriage longitudinally of said stationary frame and parallel to the axis of said cable storage frame, (j) each said traction drum has at least one groove which is elastomer lined, over which lining the cable passes before passing onto said cable storage drum, (k) one of said traction drums has a plurality of independently movable rings thereon, each of which ring is grooved to form a groove of one of said traction drums, and (l) means bindingly engaging said rings in side by side relation to permit limited relative slippage therebetween as the loops of the cable vary in tautness.

References Cited

UNITED STATES PATENTS

| | | | |
|---|---|---|---|
| 1,060,165 | 4/1913 | Cole | 254—175.7 |
| 1,661,275 | 3/1928 | Stensland | 254—175.7 |
| 2,966,221 | 12/1960 | Kinney | 254—172 |
| 3,467,360 | 9/1969 | Mizell | 254—175.7 |

HARVEY C. HORNSBY, Primary Examiner

U.S. Cl. X.R.

242—158; 254—187, 190, 139, 173